(12) United States Patent
Schumacher (10) Patent No.: US 12,370,482 B2
(45) Date of Patent: Jul. 29, 2025

(54) FILTER ELEMENT FOR AN AIR FILTER DEVICE OF A MOTOR VEHICLE, AND AIR FILTER DEVICE

(71) Applicant: MERCEDES-BENZ GROUP AG, Stuttgart (DE)

(72) Inventor: Eric Schumacher, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 323 days.

(21) Appl. No.: 17/920,567

(22) PCT Filed: Apr. 16, 2021

(86) PCT No.: PCT/EP2021/059868
§ 371 (c)(1),
(2) Date: Oct. 21, 2022

(87) PCT Pub. No.: WO2021/213906
PCT Pub. Date: Oct. 28, 2021

(65) Prior Publication Data
US 2023/0191299 A1    Jun. 22, 2023

(30) Foreign Application Priority Data

Apr. 22, 2020   (DE) ..................... 10 2020 110 941.5
Feb. 2, 2021    (DE) ..................... 10 2021 000 515.5

(51) Int. Cl.
*B01D 46/00*    (2022.01)
*B01D 46/52*    (2006.01)
*B60H 3/06*     (2006.01)

(52) U.S. Cl.
CPC ..... *B01D 46/0006* (2013.01); *B01D 46/0004* (2013.01); *B01D 46/521* (2013.01);
(Continued)

(58) Field of Classification Search
CPC ............ B01D 46/0006; B01D 46/0004; B01D 46/521; B01D 2265/025; B01D 2265/02;
(Continued)

(56) References Cited

U.S. PATENT DOCUMENTS 6,190,431 B1 * 2/2001 Jeanseau ............. B01D 53/265
55/385.2
9,675,225 B2   6/2017 Williams et al.
(Continued)

FOREIGN PATENT DOCUMENTS

DE   20 2006 004 420 U1   7/2006
DE   10 2005 031 512 A1   1/2007
(Continued)

OTHER PUBLICATIONS

PCT/EP2021/059868, International Search Report dated May 31, 2021 (Two (2) pages).
(Continued)

*Primary Examiner* — Qianping He
(74) *Attorney, Agent, or Firm* — Crowell & Moring LLP (57) ABSTRACT

A filter element for an air filter device of a motor vehicle includes a frame which surrounds a filter material. The frame has a front wall extending perpendicularly to an insertion direction in which the filter element is insertable in a receiving space of a housing of the air filter device. A securing element is disposed on a front side of the front wall on which securing element a cover of the air filter device configured for closing the receiving space is fixable. The securing element has two holding parts which are engageable with two corresponding holding parts of the cover. The two holding parts of the securing element are configured as wings projecting from a shank of the securing element transversely to the insertion direction and the two holding parts extending from a respective first end region to a
(Continued)

respective second end region, facing the front wall, are ramp-shaped.

10 Claims, 8 Drawing Sheets

(52) U.S. Cl.
CPC ..... *B60H 3/0616* (2013.01); *B01D 2265/025* (2013.01); *B60H 2003/065* (2013.01)

(58) Field of Classification Search
CPC .......... B01D 46/0005; B01D 2265/023; B01D 2265/024; B01D 46/0002; B60H 3/0616; B60H 2003/065; B23P 19/04; E06B 2009/015; E06B 2009/527; E06B 9/01; F16B 37/16; F16B 7/187; F24F 13/084; F02M 35/0201; F02M 35/02425
USPC ......................................................... 55/497
See application file for complete search history.

(56) References Cited

U.S. PATENT DOCUMENTS

| | | | |
|---|---|---|---|
| 2012/0042616 A1* | 2/2012 | Widerski | B01D 46/42 55/357 |
| 2013/0097982 A1* | 4/2013 | Inui | B01D 46/54 55/495 |
| 2020/0269174 A1* | 8/2020 | Schumacher | B01D 46/521 |

FOREIGN PATENT DOCUMENTS

| | | | |
|---|---|---|---|
| DE | 10 2007 018 215 A1 | 10/2008 | |
| DE | 102009015095 A1 * | 10/2010 | ......... B01D 46/0004 |
| DE | 10 2015 004 645 A1 | 10/2016 | |
| DE | 10 2020 110 941 A1 | 10/2021 | |
| DE | 10 2021 000 515 B3 | 3/2022 | |
| RU | 2 281 421 C2 | 1/2006 | |
| RU | 2 553 301 C2 | 1/2014 | |
| RU | 2 716 682 C2 | 6/2019 | |
| RU | 2 710 769 C1 | 1/2020 | |

OTHER PUBLICATIONS

German-language German Office Action issued in German application No. 10 2020 110 941.5 dated Dec. 4, 2020 (Seven (7) pages).
U.S. Patent Application, "Air Filter Device and Filter Element for an Air Filter Device of a Motor Vehicle", filed Oct. 21, 2022, Inventor Wolfgang Enderle et al.
U.S. Patent Application, "Filter Element for an Air Filtration Device of a Motor Vehicle and Air Filtration Device", filed Oct. 21, 2022, Inventor Eric Schumacher.
Russian-language Russian Office Action issued in Russian application No. 2022105853/04(012143) dated Oct. 3, 2022 (Eight (8) pages).
Russian-language Russian Search Report issued in Russian application No. 2022105853/04(012143) dated Sep. 20, 2022 (Two (2) pages).
Portugese-language Office Action issued in Brazilian Application No. BR112021026139-7 dated Mar. 17, 2025 with partial English translation (5 pages).

* cited by examiner

FILTER ELEMENT FOR AN AIR FILTER DEVICE OF A MOTOR VEHICLE, AND AIR FILTER DEVICE

BACKGROUND AND SUMMARY OF THE INVENTION

The invention relates to a filter element for an air filter device of a motor vehicle, with a frame, which surrounds a filter material of the filter element at least partially. The frame comprises a front wall, which extends substantially perpendicularly to an insertion direction. The filter element is insertable in the insertion direction into a receiving space of a housing of the air filter device. The invention further relates to an air filter device with a filter element of this kind.

DE 10 2007 018 215 A1 describes an air filter for an air conditioning system of a motor vehicle, in which a frame surrounds a folded filter medium. Two receptacles, into which catching means can be inserted, project from a wall of the frame. The catching means are arranged on a cover, with which a housing accommodating the air filter is closable. A sealing element, which when the housing is closed by means of the cover rests against the edge of the housing, is configured to be integral with a connecting plate of the cover.

DE 10 2015 004 645 A1 describes a filter element for filtering combustion air, which is supplied to a combustion engine of a motor vehicle. The filter element has a filter medium body, which is supported and held on an internal carrier body in the form of a supporting frame. There are end plates on axial front ends of the carrier body. Via respective connecting parts, two strap-shaped components, which have respective locking elements, are connected to one of the end plates. The components with the respective locking elements are configured to be integral with the end plates, via the connecting parts. Moreover, the components then project in a lateral direction from the filter element. With the filter element in the inserted position, the locking elements lock with opposing locking elements that are arranged on a filter housing. The locking elements are secured in a locking position by means of a cover mounted on the filter housing.

It is to be regarded as a drawback in this case that the laterally projecting components with the locking elements take up a comparatively large amount of space in the filter housing, which therefore cannot be used or be available for filtering the air that is to be filtered.

Moreover, the cover can also be fitted on the filter housing when there is no filter element in the filter housing. Both are disadvantageous.

The aim of the present invention is therefore to provide a filter element of the kind stated at the beginning, which allows good utilization of available space and reliable operation of the air filter device.

The filter element according to the invention for an air filter device of a motor vehicle has a frame, which surrounds a filter material of the filter element at least partially. The frame comprises a front wall. The front wall extends perpendicularly to an insertion direction, in which the filter element is insertable into a receiving space of a housing of the air filter device—also designated hereinafter as "air filter housing" or "housing". At least one securing element is arranged on a front side of the front wall. A cover of the air filter device, which is configured for closing the receiving space, can be fixed on the at least one securing element.

The at least one securing element has at least one holding part distanced from the front side of the front wall. Then, for the purpose of closing the receiving space by means of the cover of the air filter device, the at least one holding part can engage with a corresponding holding part of the cover. A particularly tight fit of the cover on the air filter housing can be achieved in this way. The resultant closure also holds the cover well in its closed position.

According to the invention, the at least one securing element has two holding parts, which are configured as a wing projecting from a shank of the securing element transversely to the insertion direction. A respective wing of this kind can engage particularly easily with the corresponding holding part of the cover. Moreover, a securing element with wings or holding parts of this kind only takes up a little space, wherein reliable fixing of the cover in the region of a receiving opening for the filter element on the air filter housing can be achieved, because a closing element of the cover interacts with the securing element and the closing element thus engages with the wing with a corresponding holding part.

Moreover, it is particularly advantageous that the respective holding part, which has a first and a second end region, is ramp-shaped from the one end region to the other end region. On this ramp-shaped end region, the corresponding holding part can be moved along when fixing the cover, when the cover is secured on the housing in its closed position. Owing to the ramp-like shape of the holding part on the filter side—or also wing—a particularly tight fit of the cover on the air filter housing can be achieved. Because of the ramp-like shape of the holding part, when securing the cover in its closed position, in which the cover rests on the housing, a stronger movement of the cover towards the housing, supporting the sealing, can be achieved.

A further advantage of the filter element that has the securing element arranged on the front side of the front wall is that the air filter device of the motor vehicle can only be operated when the filter element is assembled or inserted in the receiving space. Reliable closing of the receiving space by means of the cover of the air filter device requires the at least one securing element, which is a component part of the filter element. In other words a positionally secured or firm fit of the cover on the air filter housing is not possible if the filter element has not been inserted in the receiving space of the housing. In this way it is possible to prevent improper operation of the air filter device. Therefore the filter element makes reliable operation of the air filter device possible.

Moreover, the at least one securing element together with the filter element is replaced when the filter element is changed. This is advantageous because for example a clamping geometry and/or holding geometry of the securing element are subject to wear when the cover of the air filter device is fitted on the securing element, for the receiving space formed in the air filter housing to be closed by means of the cover.

Preferably, in the vertical direction of the front wall, the at least one securing element is distanced from a lower edge of the front wall and stands away from the front side against the insertion direction.

Owing to this freely accessible arrangement of the securing element, at the front of the filter element there is good accessibility for securing with the closing element on the cover side, which advantageously has a sleeve-shaped holding region, in which the securing element is insertable. In particular, as a result the closing element arranged on the cover surrounds or grips round the securing element. This is advantageous for robust and reliable fixing of the cover on the filter element.

Through rotation of the closing element about a rotation axis, the at least one securing element surrounded by the holding region can be braced by the closing element of the cover, as the retaining elements on the filter element side come up against the retaining elements on the closing element on the cover side. In this way, very robust and loadable fixing or fixation of the cover on the filter element is attainable.

It is sufficient if the securing element only extends a little bit beyond the front side against the insertion direction. The associated small height of the securing element, viewed in the insertion direction, is advantageous with respect to good utilization of the available space by the filter material of the filter element.

In a further preferred configuration, a holding lug projects from the front wall on a narrow side of the filter element. The filter element can be secured against movement by inserting the holding lug into a retaining recess provided on the housing side of the air filter device.

When the holding lug is inserted in the retaining recess of the housing, the filter element can no longer be inserted farther into the housing or be withdrawn from the housing against the insertion direction. This also applies when the insertion direction is not horizontal, but instead the filter element is inserted or pushed into the receiving space obliquely to the horizontal. Even in such a case, the holding lug prevents sliding out of the receiving space or sliding farther into the receiving space, as soon as the holding lug is inserted in the retaining recess. Insertion of the holding lug in the retaining recess ensures that the whole filter element is oriented in the correct position. That is, in this assembly position of the filter element in the housing, the at least one securing element is at the same time also oriented in the correct position for securing the cover of the air filter device.

If the holding lug projects on a lower—relative to the fitting position—narrow side of the front wall, on inserting or pushing the filter element into the receiving space, gravity has the effect that when the retaining recess in the housing is reached by the holding lug, the front wall drops down. As a result, it is extremely easy to mount the filter element in the housing of the air filter device.

The presence of the holding lug, which is provided for insertion in the retaining recess provided on the housing side, means in addition that when dismantling the filter element, and thus when removing the filter element from the receiving space, the front wall and therefore the whole filter element must first be raised a bit. In this way it is possible to prevent the filter element—more precisely the filter material of the filter element—remaining hanging in the region of the housing of the air filter device and possibly being damaged. This is in particular sensible when the filter element is only dismantled temporarily, for instance to remove dust or solids from the filter element by shaking or tapping, and then the filter element is put back into the housing.

Preferably the holding lug is configured to be integral with the body of the front wall. The holding lug can thus be made particularly easily and at low cost during manufacture of the frame. Moreover, it may be envisaged that the holding lug has a thickness in the insertion direction that corresponds to a thickness of the narrow side of the plate-shaped body. In this way the holding lug is configured to be particularly robust and loadable.

Preferably the filter element has a supporting spacer at least supporting the filter material, extending between two opposite walls of the frame of the filter element, and joining the two walls together. By providing the supporting spacer, the frame and in addition the filter material are stabilized well, which the frame of the filter element surrounds at least partially (and preferably completely), or around which the frame of the filter element extends at least partially (and preferably completely). This makes it possible for example, after removal of the filter element from the receiving space, for solids in the form of dust or the like, retained on a crude air side of the filter material, to be removed from the filter material by shaking or tapping, without permanently impairing the form of the filter material.

If the filter material has a plurality of pleats, the supporting spacer may have projections configured in the manner of teeth or pins, which project from for example a strip-shaped back of the supporting spacer and fit into the pleats of the filter material. Thus, even during and after removal of solids from the pleated filter material by tapping or shaking or the like, the shape of the pleats of the filter material can be retained very well.

The air filter device according to the invention for a motor vehicle has a filter element according to the invention, wherein the filter element is inserted in a receiving space, which is formed in a housing of the air filter device.

The air filter device may in particular be configured as an air filter device of an air conditioning system or ventilation device of the motor vehicle. Furthermore, the air filter device may be intended for an intake tract of a combustion engine of the motor vehicle, i.e., as filter for the air drawn in by a combustion engine.

The receiving space is closable by means of a cover to seal the housing of the air filter device against the surroundings, wherein the cover has at least one closing element, which is mounted on the two ramp-shaped holding parts of the at least one securing element of the filter element according to the invention. Fixing the cover directly on the filter element or on the securing element of the filter element ensures that the air filter housing can only be closed by means of the cover when a filter element according to the invention is present and correctly mounted in the receiving space. This reliably prevents the possibility of the air filter device being operated without a filter element inserted.

Preferably the at least one closing element of the cover is rotatable about a rotation axis and is configured as sleeve-shaped, so that it fits round the at least one securing element on the filter side, and in a closing position the two holding parts of the closing element on the cover side grip behind the two corresponding holding parts of the securing element on the filter side and—owing to the ramp-shaped configuration of the holding parts on the securing element side—are braced against each other. Owing to this interaction of the closing element with the securing element, a particularly secure and firm fixing of the cover in its position on the housing is attainable.

In particular, it may also be envisaged that the cover is held swivelling on the air filter housing. Very intuitive operation of the device thus becomes possible.

In a further preferred embodiment, it is envisaged that the housing of the air filter device has at least one retaining recess, in which the holding lug of the filter element can be inserted.

If the holding lug of the filter element is engaged in the retaining recess provided, the filter element—or the securing element thereon—is correctly positioned in the receiving space, so that the cover of the air filter device can be fastened by means of the at least one closing element on the at least one securing element on the filter side, and in this way the housing is closed. Through this arrangement it is possible to ensure that the receiving space can only be closed by means of the cover when the filter element is correctly fitted in the air filter housing, and the air filter device cannot be operated inadvertently without a filter element.

Preferably the housing of the air filter device has at least one retaining element, which is upstream of a retaining recess in the insertion direction. A retaining element of this kind—in particular in conjunction with the retaining recess—ensures that, as soon as the holding lug is located in the retaining recess, the filter element cannot move out of the receiving space unintentionally. In particular, it may be envisaged that the holding lug rests on the at least one retaining element, when the holding lug has been inserted in the retaining recess and the cover has been fixed on the filter element.

The at least one retaining element may in particular be configured as a ramp-shaped retaining tooth sloping upwards, viewed in the insertion direction. In the longitudinal direction of extension of the retaining recess—i.e., transversely to the insertion direction— several such ramp-shaped retaining teeth may be provided upstream of the retaining recess in the insertion direction. Then an underside of the holding lug can be pushed very easily over these ramp-shaped retaining teeth, until the holding lug, preferably under the action of gravity, is lowered into the retaining recess, which is downstream of the retaining teeth in the insertion direction. The holding lug may thus in particular be undercut with the ramp-shaped retaining tooth, as soon as the holding lug engages in the retaining recess.

Preferably the housing has at least one ramp, which in the longitudinal direction of extension of the retaining recess is arranged next to the retaining recess. In this case the at least one ramp is configured as sloping downwards, starting from the retaining recess viewed in the insertion direction. With a ramp of this kind, catching of the filter element and/or damage of the filter material during removal or extraction of the filter element from the receiving space can be prevented very easily and reliably.

If the filter element has the at least one supporting spacer, which joins the side walls of the frame together, the at least one ramp also prevents the filter element with a supporting spacer of this kind getting caught on a component of the housing or the supporting spacer becoming hooked on such a component.

Preferably the at least one ramp has an apex region, wherein a height of the at least one ramp in the apex region is greater than the maximum height of the at least one retaining element. It is thus very easy to ensure that the frame of the filter element does not get caught on the at least one retaining element during extraction of the filter element from the receiving space.

Additionally or alternatively, it may be envisaged that the at least one ramp, viewed in the insertion direction, is configured to be sloping upwards towards the apex region. This facilitates insertion of the filter element into the receiving space, which is formed in the housing of the air filter device.

The advantages and preferred embodiments described for the filter element according to the invention also apply to the air filter device according to the invention, and vice versa.

Further advantages, features and details of the invention can be seen from the following description of preferred embodiment examples and from the drawings. The features and combinations of features mentioned above in the description and the features and combinations of features mentioned hereunder in the description of the figures and/or only shown in the figures are applicable not only in the combination given in each case, but also in other combinations or alone, while remaining within the scope of the invention.

DETAILED DESCRIPTION OF THE DRAWINGS

Identical or functionally equivalent elements in the figures are given the same reference symbol.

Figure 1:
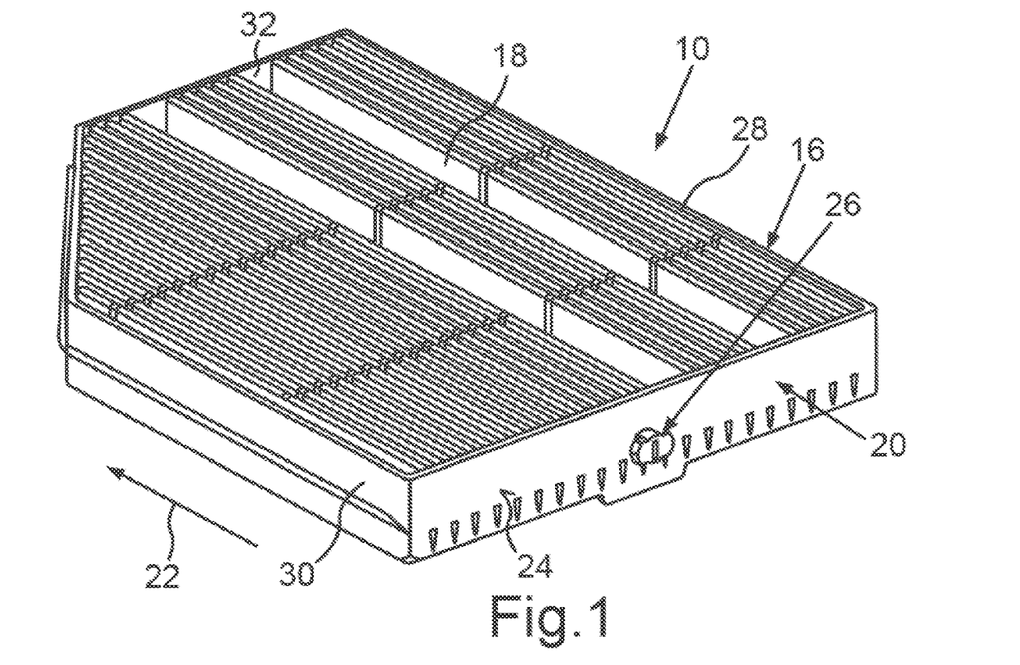
FIG. 1 is a schematic perspective view of a filter element for an air filter device of a motor vehicle.

FIG. 1 shows a schematic perspective view of a filter element 10, which is provided for mounting in a housing 12 (cf. FIG. 3) of an air filter device of a motor vehicle, configured in particular as a lorry. A receiving space 14 is formed in the housing 12 of the air filter device (cf. FIG. 3), into which the filter element 10 shown in FIG. 1 can be inserted or fitted.

The filter element 10 comprises a frame 16, which surrounds or frames a filter material 18 of the filter element 10. When the filter element 10 is configured as a pleated filter, the filter material 18 may, as shown as an example in the present description, have a plurality of pleats. However, other configurations of the filter material 18, through which air can flow during operation of the filter element 10, are also possible.

The frame 16, which here completely surrounds or encloses the filter material 18 on the periphery, comprises a front wall 20. The front wall 20 extends perpendicularly to an insertion direction 22, which is indicated by an arrow in FIG. 1. In the insertion direction 22, the filter element 10 can be inserted in the receiving space 14, which is formed in the housing 12 or air filter housing (cf. FIG. 3).

Figure 2:
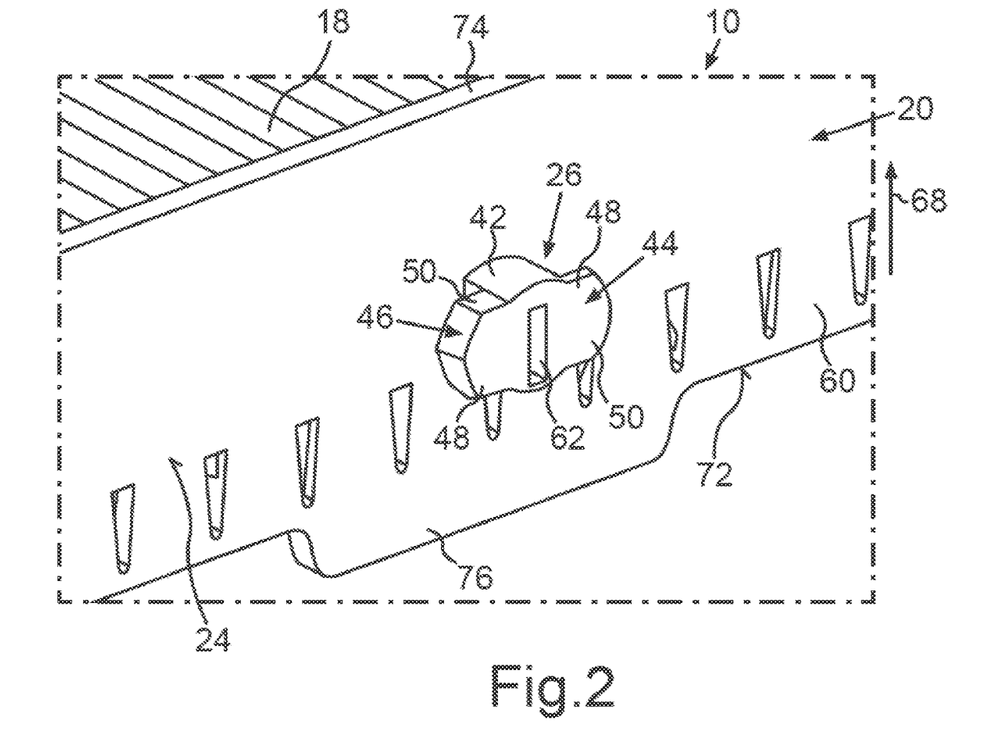
FIG. 2 is an enlarged view of a detail of the filter element according to FIG. 1, in which a securing element arranged on a front side of a front wall of a frame of the filter element can be seen more clearly.

A securing element 26, which is shown in an enlarged view in FIG. 2, is arranged on a front side 24 of the front wall 20. Here, the frame 16 also comprises two side walls 28, 30, which extend in the insertion direction 22 starting from the front wall 20.

On its back end, the frame 16 is closed by means of a rear wall 32, which is configured angled here. This is due to the shape of the housing 12, so that in variants of the filter element 10, a differently shaped frame 16 may also be provided. Moreover, the frame 16 need not, as shown as an example here, surround the filter material 18 round the periphery.

Figure 9:
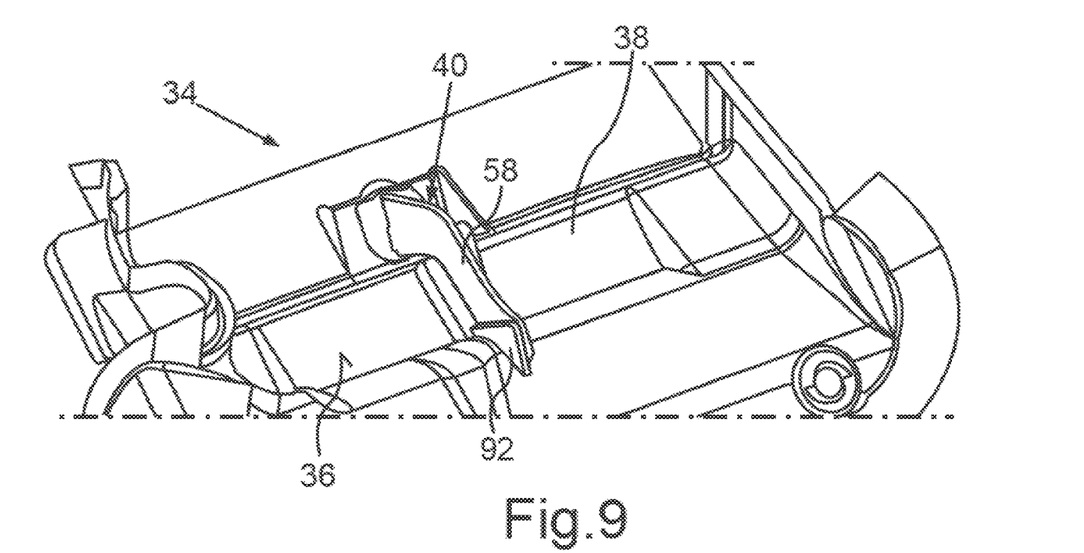
FIG. 9 is a front view of a detail of a cover for the housing of the air filter device, wherein the cover has a closing element configured as a rotating closure, which interacts with the securing element of the filter element shown in FIG. 2 for fixing the cover.

The securing element 26 shown in FIG. 2 serves for fixing or securing a cover element or cover 34 on the housing 12. The cover 34 is shown in FIG. 9 as a detail, in a view of its outer side 36 facing the surroundings of the housing 12.

Figure 10:
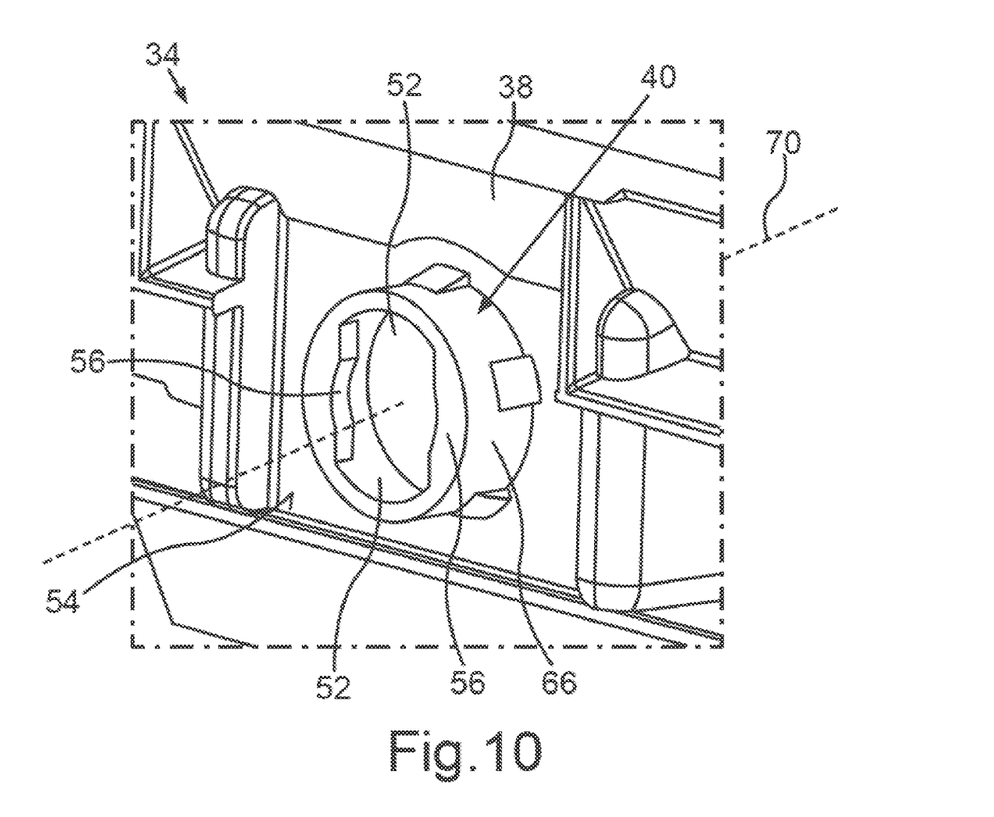
FIG. 10 is a detail of a back view of the cover in the region of the rotating closure.

A closing element, which is configured here as a rotating closure 40, is held on a body 38 of the cover 34. By means of a lever-like handle part 58, the rotating closure 40 can be turned relative to the body 38 of the cover 34 about a rotation axis 70, as indicated in FIG. 10. The securing element 26 interacts with the rotating closure 40 (cf. FIG. 2), to secure the cover 34 in its closed position.

For this purpose, the securing element 26 has a shank 42, which in this case is configured like a cylinder with a (optional) slot-shaped recess 62. The shank 42 projects from the front side 24 of the front wall 20 in the insertion direction 22. Two holding parts in the form of a first wing 44 and a second wing 46 extend from the shank 42, in this case substantially perpendicularly to the insertion direction 22.

From a respective first end region 48 up to a second, opposite end region 50, the respective wing 44, 46 preferably has a ramp-like shape. Accordingly, the respective wing 44, 46 gets thicker starting from the respective first end region 48 towards a height of the respective wing 44, 46 towards the opposite end region 50 of the respective wing 44, 46. The height of the respective wing 44, 46 thus corresponds to a thickness of the respective wing 44, 46 in the insertion direction 22. The ramp formed on the respective wing 44, 46 therefore points towards the front wall 20 of the filter element 10.

Recesses 52 (cf. FIG. 10), which are formed on an inner side 54 of the cover 34 in the region of the rotating closure 40, correspond to the wings 44, 46. Moreover, the rotating closure 40 according to FIG. 10 has, on its inner side, two holding parts 56, which are configured for engaging with the wings 44, 46 of the securing element 26, when the cover 34 is secured in its closed position, in which the cover 34 closes the receiving space 14 in the region of a receiving opening 64 (cf. FIG. 3). The filter element 10 can be introduced into the receiving space 14 via the receiving opening 64.

With the wings 44, 46, clamping geometries or holding geometries are provided on the side with the filter element 10, which interact with the holding parts 56 of the rotating closure 40, to secure the cover 34 in its closed position. Here, the rotating closure 40 fitted on the cover 34 thus has the holding parts 56, which correspond to the clamping geometry or holding geometry that is provided by the wings 44, 46.

The securing element 26, which is preferably joined rigidly to the frame 16 of the filter element 10 or is configured to be integral with the front wall 20, accordingly in this present case provides fixing or fixation of the cover 34 in its closed or closing position in the manner of bayonet locking. In the closed or closing position, the cover 34 closes the receiving space 14 formed in the housing 12 in the region of the receiving opening 64.

It can also be seen from FIG. 10 that the rotating closure 40 has a sleeve-shaped holding region 66, into which the securing element 26 can be introduced, so that the cover 34 is closed. For this purpose, the recesses 52 of the rotating closure 40 are firstly aligned so that the wings 44, 46 in the region of the recesses 52 can enter the sleeve-shaped holding region 66. The holding region 66 then surrounds the securing element 26. If then, through actuation of the handle part 58 (cf. FIG. 9), the rotating closure 40 is turned or rotated about its rotation axis 70, the holding parts 56 of the rotating closure 40 come into engagement with the wings 44, 46. Owing to the ramp-like shape of the wings 44, 46, the securing element 26 is braced with the rotating closure 40 of the cover 34, and the cover 34 is drawn tightly against the housing 12.

Owing to the geometry of the recesses 52, which corresponds to the shape of the wings 44, 46, a person who is closing the receiving space 14 of the housing 12 by means of the cover 34 will visually comprehend intuitively the manner of operation of the rotating closure 40. This is advantageous for easy operation of the rotating closure 40.

For the handle part 58, a stop 92 can be formed on the cover 34 (cf. FIG. 9), which presets an end position of the rotating closure 40 during fixing of the cover 34. In this end position, the holding parts 56 of the rotating closure 40 (cf. FIG. 10) are in engagement with the wings 44, 46 of the securing element 26 (cf. FIG. 2).

It can also be seen from FIG. 2 that the front wall 20 has an upper narrow side 74. This upper narrow side 74 lies in the vertical direction 68 of the filter element 10, which is indicated by an arrow in FIG. 2, opposite a lower narrow side 72 of a plate-shaped body 60 of the front wall 20. In the installed position of the filter element 10, the vertical direction 68 is preferably opposite the direction of gravity.

In the present case, the filter element 10 has a holding lug 76, distanced from the securing element 26. This holding lug 76 projects above the lower narrow side 72—or bottom edge—of the plate-shaped body 60 of the front wall 20. Here, this holding lug 76 is made integral with the body 60 of the front wall 20. The functions of this holding lug 76 will be explained hereunder, referring to the next figures.

Figure 3:
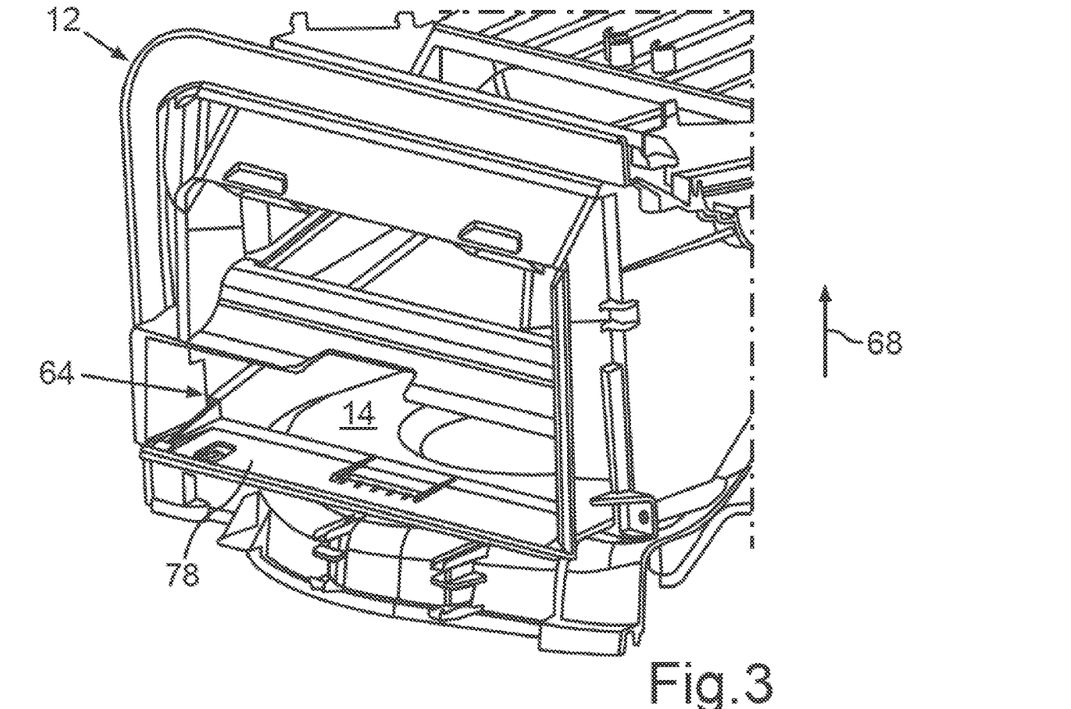
FIG. 3 is a detail of a housing of the air filter device, which is configured to receive the filter element according to FIG. 1.

As can be seen from FIG. 3, the receiving opening 64 is delimited at the bottom by a wall 78. This wall 78 is shown in FIG. 4 as a partially sectional detail.

Figure 4:
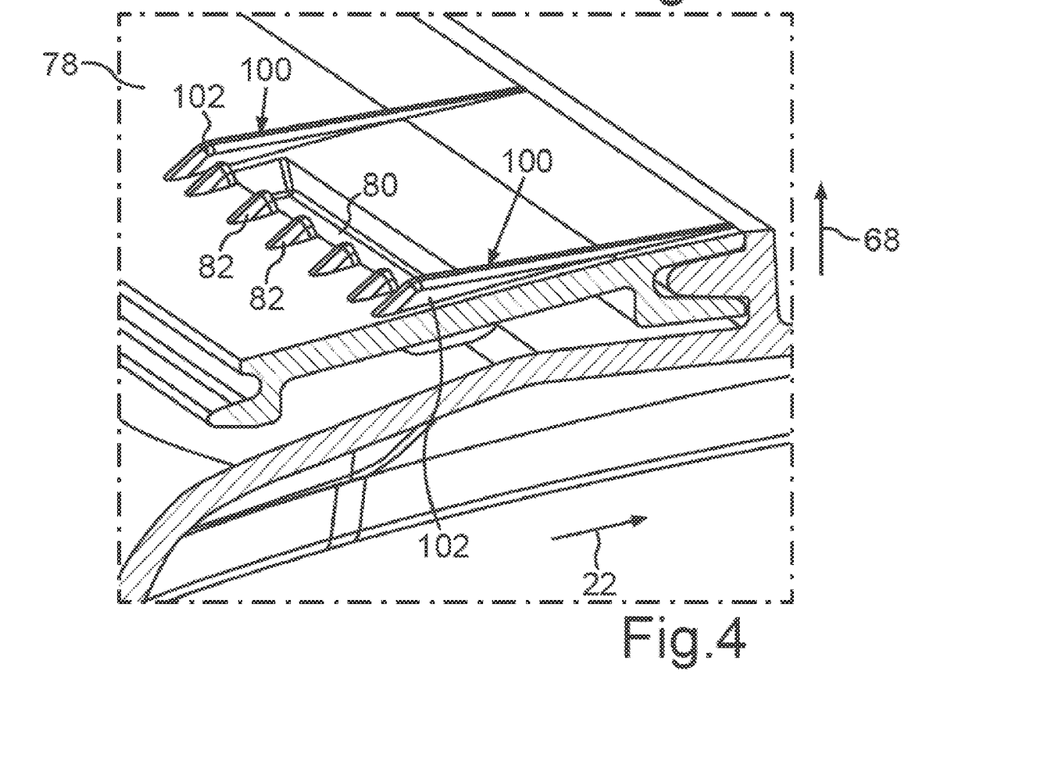
FIG. 4 is a partially sectional view of a detail in the region of a receiving opening of the housing, via which the filter element according to FIG. 1 can be pushed into the housing.

In particular, it is clear from FIG. 4 that a retaining recess 80 is formed in the wall 78, corresponding in dimensions, here in particular with respect to a depth in the insertion direction 22 and a width perpendicular to the insertion direction 22, to the dimensions of the holding lug 76.

Accordingly, the holding lug 76 of the filter element 10 can be inserted in the retaining recess 80, which is provided on the housing 12 side of the air filter device. When the filter element 10 is located in its assembled position in the receiving space 14 of the housing 12 (cf. FIG. 8), the holding lug 76 is then engaged in the retaining recess 80.

The holding lug 76 or catch, which is formed on the lower edge of the frame 16, thus functions like an abutment of the filter element 10. Accordingly, the holding lug 76 prevents the filter element 10 sliding out of the receiving space 14. This is in particular advantageous when the insertion direction 22 in the concrete assembled situation of the filter element 10 is not horizontal, but inclined.

Furthermore, the holding lug 76 serves for presetting of the filter element 10 with respect to the cover 34. Thus, when the holding lug 76 is located in the retaining recess 80, the securing element 26 or retaining element is also oriented in the correct position, i.e., so that the rotating closure 40 (cf. FIG. 9 and FIG. 10) can interact with the opposite securing element 26.

In the present case, the securing element 26 is arranged in the width direction or transverse direction of the front wall 20, i.e., viewed perpendicularly to the insertion direction 22, substantially centrally on the front side 24 of the front wall 20. This produces very uniform pressing of the cover 34 against the housing 12, when the rotating closure 40 is actuated and is thus rotated about the rotation axis 70.

Moreover, the two large-area ramps of the securing element 26, provided in the region of the wings 44, 46, ensure very robust fixing of the cover 34 on the filter element 10.

During bracing of the closing element 40 with the securing element 26 through actuation of the rotating closure 40, the front side 24 of the filter element 10 connected via the holding lug 76 comes up against retaining elements, which in the present case are configured in the manner of ramp-shaped retaining teeth 82 (cf. FIG. 4), and which are located upstream of the retaining recess 80 in the insertion direction 22. The retaining recess 80 and the retaining elements 82 thus form the abutment for bracing the cover 34 and filter element 10 by means of their respective closure element 40 or securing element 26.

Figure 5:
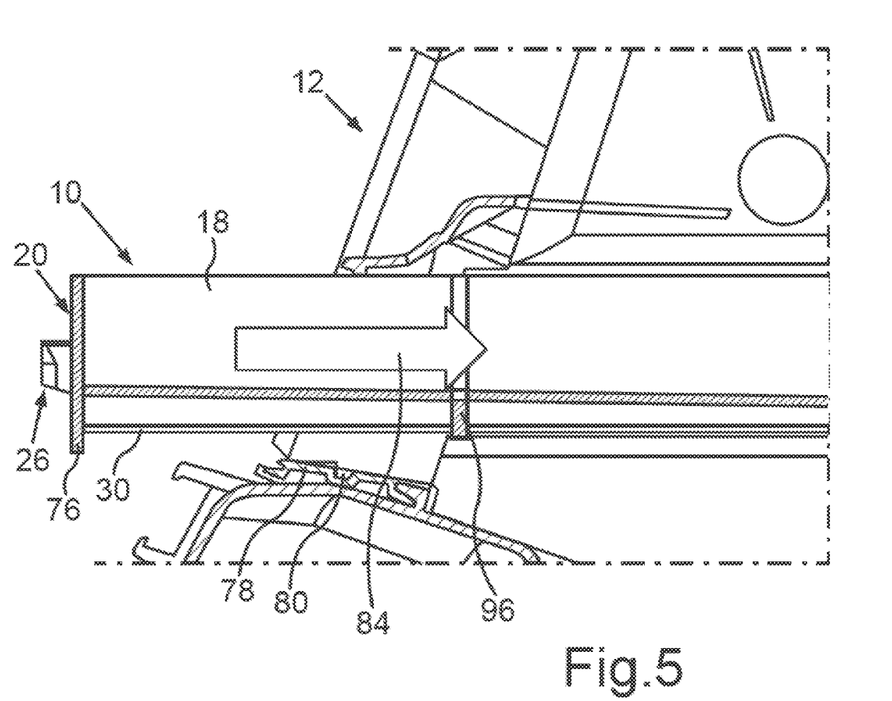
FIG. 5 is a partially sectional side view of insertion of the filter element according to FIG. 1 in the housing according to FIG. 3.

In the present case, the retaining teeth 82, viewed in the insertion direction 22, are upward-sloping, so that the holding lug 76, on sliding along the retaining teeth 82, first moves in the vertical direction 68, when the filter element 10 is pushed into the receiving space 14 via the receiving opening 64. In FIG. 5, this pushing of the filter element 10 into the receiving space 14 is indicated by an arrow 84, the direction of which is the same as the insertion direction 22.

Figure 6:
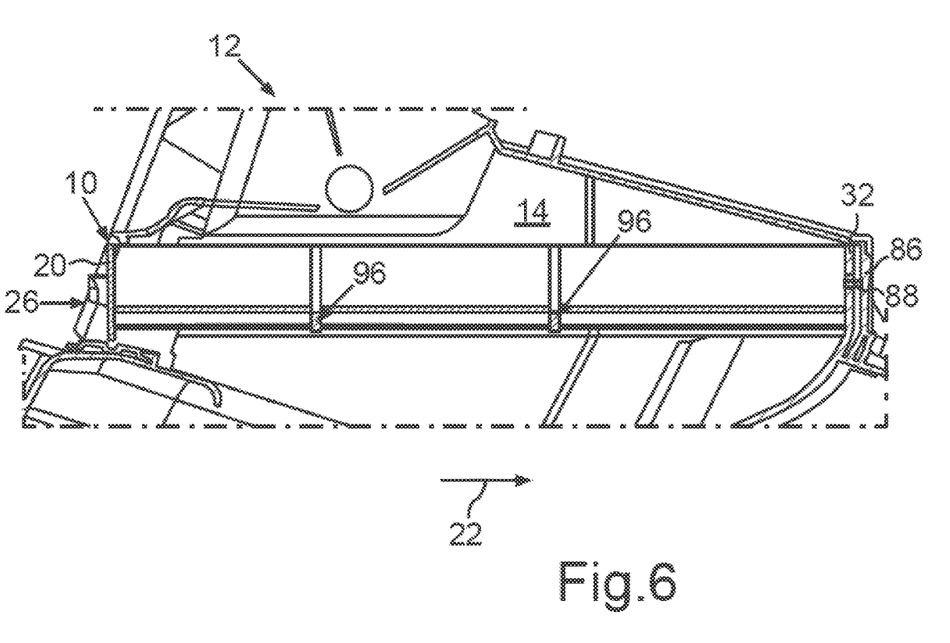
FIG. 6 is a partially sectional side view of the filter element inserted in a receiving space of the housing, which has reached its end position in the insertion direction.

FIG. 6 now shows the situation in which the filter element 10 has reached its horizontal end position in the receiving space 14. Accordingly, the rear wall 32 of the frame 16 is located in the vicinity of a wall 86 of the housing 12 that delimits the receiving space 14 at the back. In particular, a seal 88 arranged on the rear wall 32 of the frame 16 may in this case abut against the wall 86.

Figure 7:
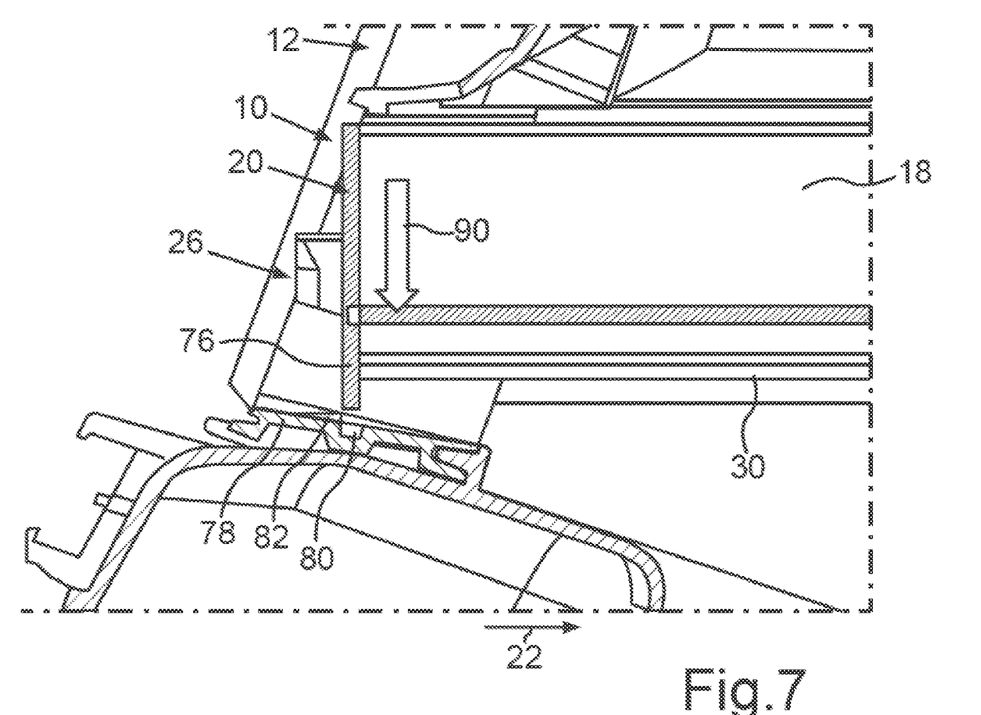
FIG. 7 is an enlarged view of a detail of a front segment of the filter element and of the housing, wherein the front wall of the filter element is located at the level of a retaining recess, which is configured on the housing side.

In FIG. 7, another arrow 90 indicates how, after passing over the retaining teeth 82 (cf. FIG. 4) and reaching the retaining recess 80, the holding lug 76 drops down under the effect of gravity. Thus, under the effect of gravity, the holding lug 76 goes into the retaining recess 80, configured as a slot. Then the frame 16 of the filter element 10 drops down under the effect of gravity, as soon as the holding lug 76 is located at the level of the retaining recess 80 in the insertion direction 22.

Figure 8:
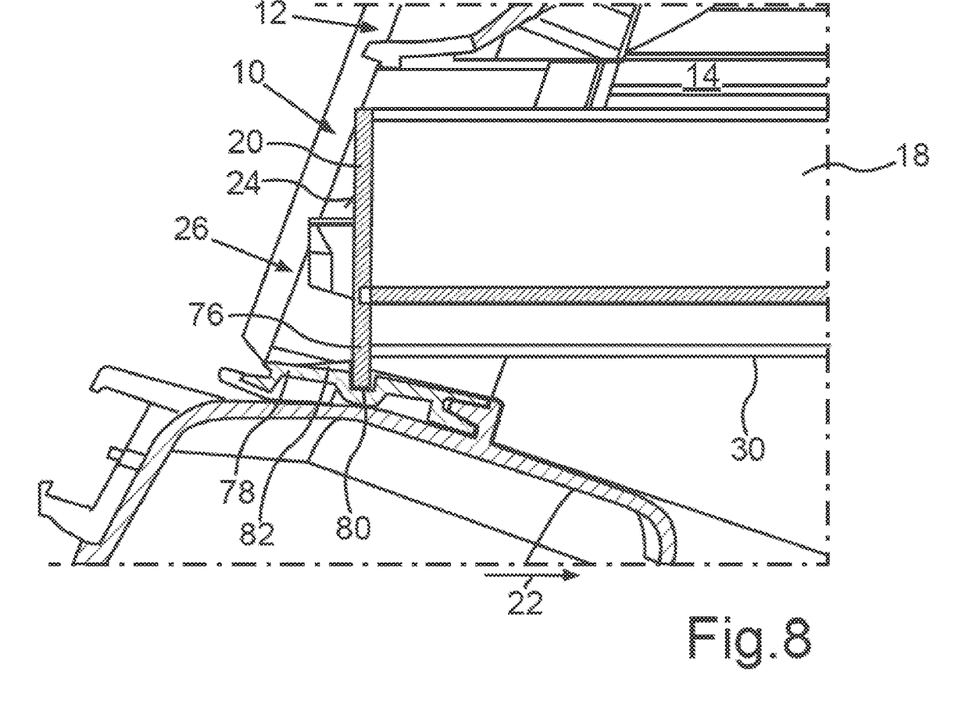
FIG. 8 illustrates the lowering of the front wall under the effect of gravity, so that a holding lug of the filter element, configured to be integral with the front wall, engages in the retaining recess.

FIG. 8 shows this assembled situation, in which the holding lug 76 engages in the retaining recess 80. In the extraction direction, i.e., opposite the insertion direction 22, the holding lug 76 is therefore undercut with the housing 12. Then the securing element 26 is also in its correct position, in which after folding down of the cover 34 or with a corresponding swivelling of the cover 34 about a swivel axis provided on the housing 12 side, the rotating closure 40 can interact with the securing element 26.

Figure 11:
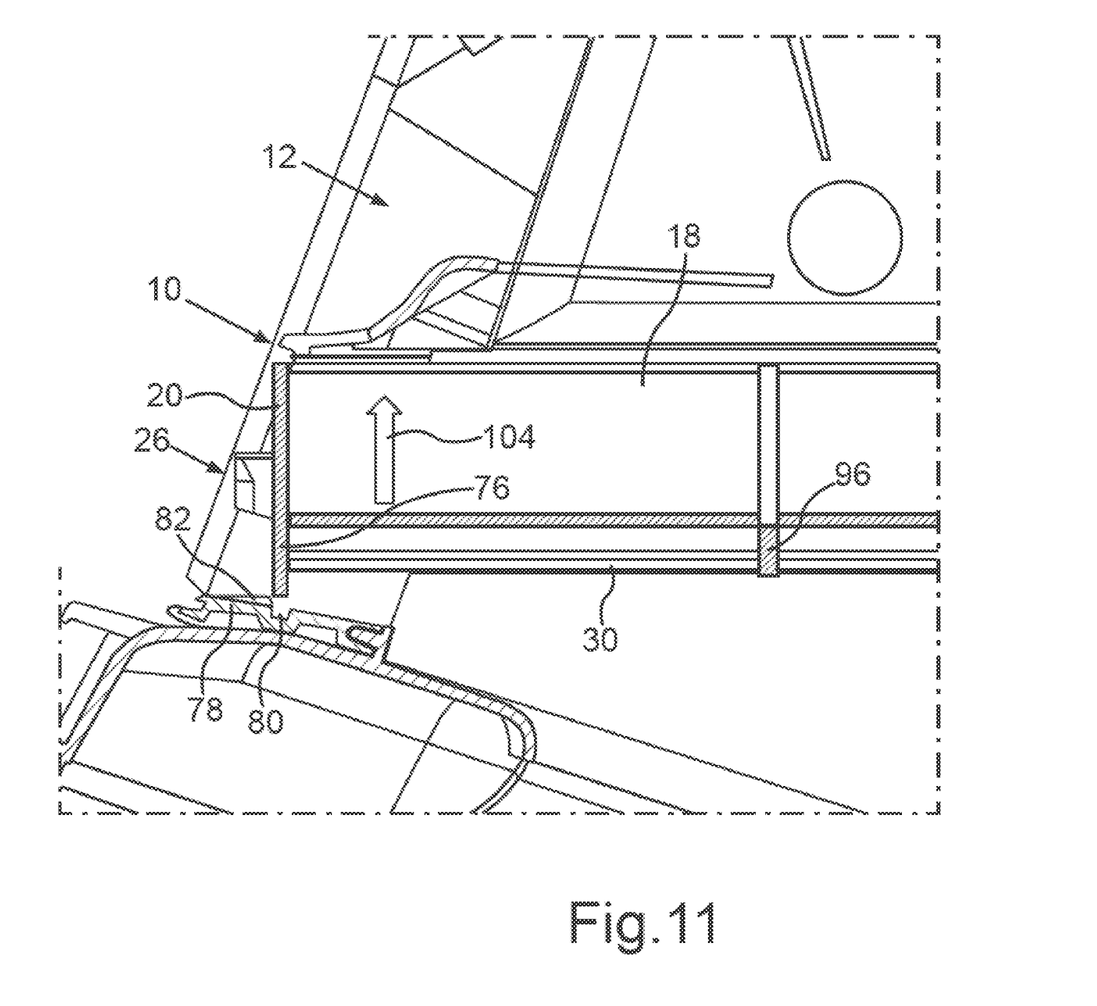
FIG. 11 illustrates a first step in dismantling the filter element or in dismounting the filter element, wherein the filter element is raised in the region of the front wall and the holding lug is thus moved out of the retaining recess.

Removal of the filter element 10 from the receiving space 14 will be explained by referring to FIG. 11 and FIG. 12. First, the frame 16 of the filter element 10 is raised in the region of the front wall 20, so that the holding lug 76 is no longer located in the retaining recess 80. This moving of the holding lug 76 out of the retaining recess 80 is indicated in FIG. 11 with an arrow 104, the direction of the arrow being opposite to the arrow 90 shown in FIG. 7. Otherwise the orientation of the filter element 10 relative to the housing 12 shown in FIG. 7 corresponds to the orientation of the filter element 10 relative to the housing 12 shown in FIG. 11.

Next, the filter element 10 is pulled out of the receiving space 14 against the insertion direction 22. This movement is indicated in FIG. 12 with an arrow 94. In addition, FIG. 12 shows a partial sectional view of supporting spacers 96 of the frame 16.

Figure 13:
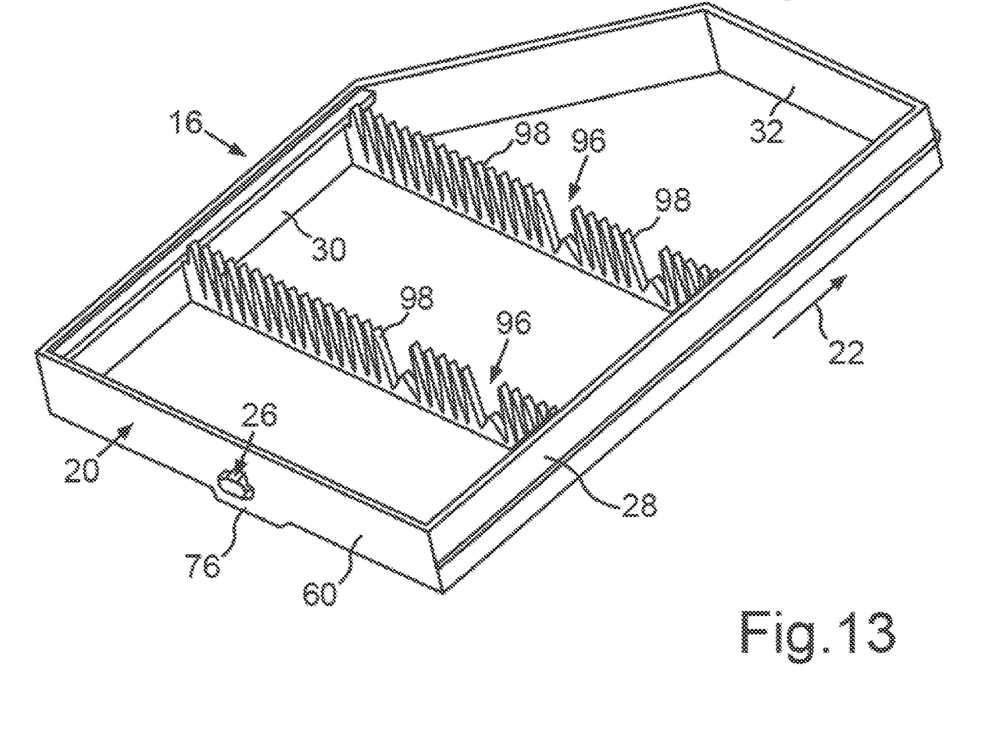
FIG. 13 is a perspective view of the frame of the filter element according to FIG. 1 comprising two supporting spacers without a filter material of the filter element.

It can be seen from FIG. 13 that in the present case the frame 16 of the filter element 10 has two such supporting spacers 96. Here, the supporting spacers 96 join the side walls 28, 30 together, but may also join the front wall 20 and the rear wall 32 together, depending on in which direction the filter element 10 is to be supported. This is necessary in particular if the extent of the filter area in one direction is very large, and therefore instability of filter element 10 arises.

Furthermore, the supporting spacers 96 have a plurality of projections formed in the manner of teeth 98 of a comb. These teeth 98, which project upwards or in the vertical direction 68 from an in this case strip-shaped back of the respective supporting spacers 96, engage at the bottom in the pleats of the filter material 18 (cf. FIG. 1). In this way, in particular the teeth 98 of the supporting spacers 96, which get narrower towards a free end, support the filter material 18. Provision of the supporting spacers 96 and the teeth 98 ensures great dimensional stability of the frame 16 and in particular of the filter material 18, even if the filter element 10 is of comparatively long configuration in the insertion direction 22. The latter may be the case in particular when using the filter element 10 for an air filter device of a lorry.

The supporting spacers 96 ensure in particular that solids that have been deposited on the filter material 18 during operation of the air filter device can easily be tapped or shaken from the filter material 18, without in this case affecting the pleats of the filter material 18.

Figure 12:
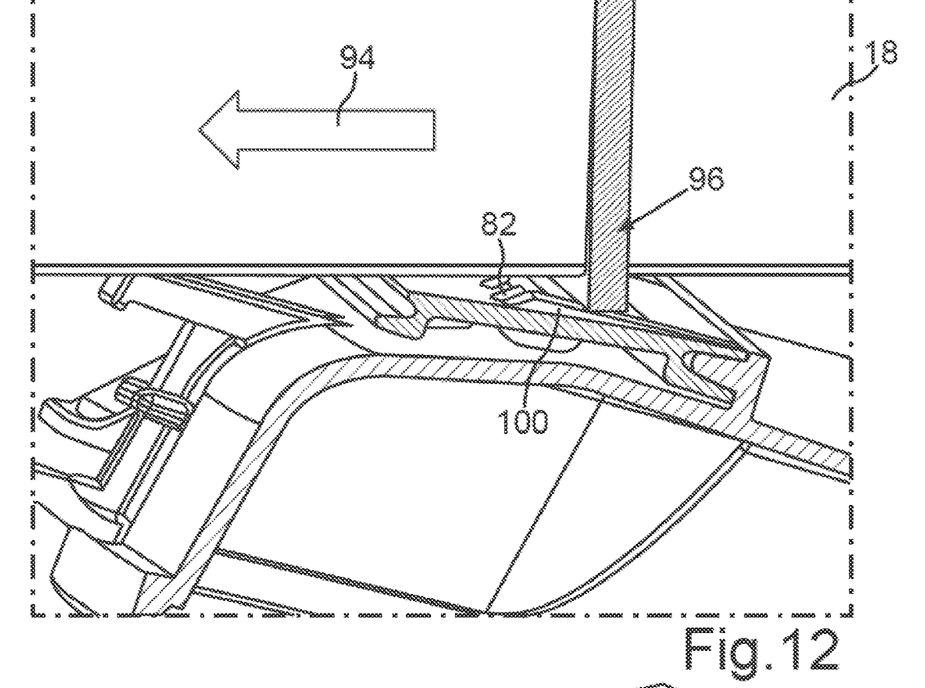
FIG. 12 is a partially sectional view of sliding a supporting spacer of a plurality of supporting spacers of the frame along ramps arranged on both sides of the retaining recess during extraction of the filter element from the receiving space.

It can clearly be seen from FIG. 12, especially when viewed in conjunction with FIG. 4, that during extraction of the filter element 10 from the receiving space 14 against the insertion direction 22, an underside of the supporting spacers 96 is led along respective ramps 100. The ramps 100 thus serve as starting slopes for the filter element 10 during extraction of the filter element 10 from the receiving space 14.

In the present case, two ramps 100 are formed on the wall 78, which are arranged in the longitudinal direction of extension of the retaining recess 80 or in the longitudinal direction of the slot-shaped retaining recess 80 alongside the retaining recess 80 (cf. FIG. 4).

Starting from an apex region 102 of the respective ramp 100, which is located roughly at the height of a front edge of the retaining recess 80, the ramps 100, viewed in the insertion direction 22, are configured as sloping downwards. In the apex region 102, the ramps 100 have in the present case a height that is greater than a maximum height of the retaining teeth 82. During extraction of the filter element 10 from the receiving space 14 against the insertion direction 22, in particular this prevents the supporting spacers 96 getting hooked on the retaining teeth 82 or catching on the retaining teeth 82 (cf. FIG. 12).

Moreover, the ramps 100, viewed in the insertion direction 22, are configured as sloping upwards towards the apex region 102, as also are the retaining teeth 82 (cf. FIG. 4). Accordingly, the ramps 100 also prevent the filter element 10 hooking on the retaining teeth 82 during insertion of the filter element 10 in the receiving space 14.

The ramps 100 additionally prevent the rear wall 32 of the frame 16 in particular hooking on the retaining teeth 82 during extraction of the filter element 10 from the receiving space 14, and prevent the filter material 18 being damaged during removal of the filter element 10 from the receiving space 14.

Figure 14:
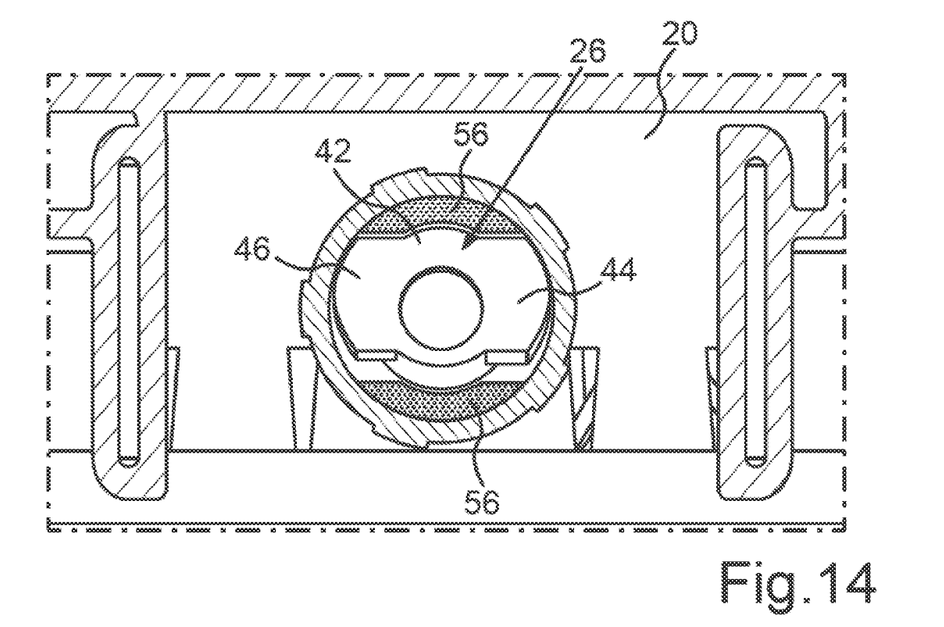
FIG. 14 is a sectional view of the air filter device in the region of the cover, wherein a securing element on the filter side is surrounded by a closing element on the cover side.

The sectional view through the cover 34 shown in FIG. 14 shows the situation in which the holding parts or wings 44, 46 of the securing element 26 are not yet engaged with the holding parts 56 of the rotating closure 40.

Figure 15:
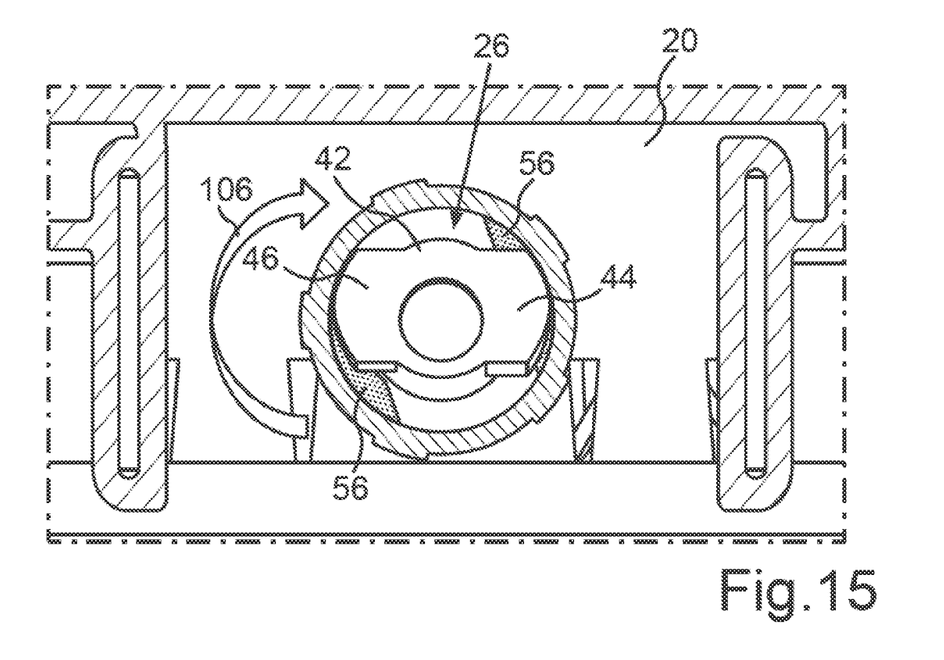
FIG. 15 is the sectional view according to FIG. 14, wherein the securing element and the closing element are in the closing position.

Turning the rotating closure 40 relative to the securing element 26 ensures, as shown in FIG. 15, that the holding parts 56 engage with the wings 44, 46. The corresponding rotating movement of the rotating closure 40 is also indicated in FIG. 15 with a curved arrow, which shows the direction of rotation 106.

The invention claimed is:

1. A filter element (10) for an air filter device of a motor vehicle, comprising:
a frame (16) which surrounds a filter material (18) of the filter element (10) at least partially, wherein the frame (16) comprises a front wall (20) which extends perpendicularly to an insertion direction (22) in which the filter element (10) is insertable in a receiving space (14) of a housing (12) of the air filter device; and
a securing element (26) disposed on a front side (24) of the front wall (20) on which securing element (26) a cover (34) of the air filter device configured for closing the receiving space (14) is fixable, wherein the securing element (26) has two holding parts (44, 46) distanced from the front side (24) of the front wall (20) which for closing the receiving space (14) by the cover (34) are engageable with two corresponding holding parts (56) of a closing element (40) on of the cover (34);
wherein each of the two holding parts (44, 46) of the securing element (26) is configured as a respective wing that projects from a shank (42) of the securing element (26) transversely to the insertion direction (22) and wherein from a respective first end region (48) up to a respective opposite second end region (50) each wing is, ramp-shaped such that the wing gets thicker starting from the respective first end region (48) towards a height of the wing and towards the respective opposite second end region (50) and such that a ramp formed on the wing points toward the front wall (20) of the filter element (10).

2. The filter element according to claim 1, wherein the securing element (26) is distanced, in a vertical direction (68) of the front wall (20), from a lower edge of the front wall (20), and against the insertion direction (22) projects from the front side (24) such that it is insertable in a sleeve-shaped holding region (66) of the closing element (40) disposed on the cover (34), wherein the securing element (26) when surrounded by the holding region (GG) is braceable on the two holding parts (44, 4G) by rotating the closing element (40) about a rotation axis (70) with the two corresponding holding parts (56) of the closing element (40) on the cover (34).

3. The filter element according to claim 1, wherein a holding lug (76) projects on a narrow side (72) of the front wall (20) of the filter element (10) and wherein the holding lug (76) is insertable in a retaining recess (80) provided on the housing (12) of the air filter device to secure the filter element (10) against movement.

4. The filter element according to claim 1, wherein the filter element (10) has a supporting spacer (96) that supports the filter material (18) and wherein the supporting spacer (96) extends between two opposite walls of the frame (16) and joins the two opposite walls together.

5. An air filter device for a motor vehicle, comprising:
a housing (12) with a receiving space (14);
a closing element (40) disposed on a cover (34); and
the filter element (10) according to claim 1, wherein the filter element (10) is disposed in the receiving space (14) of the housing (12);
wherein the receiving space (14) is closable by the closing element (40) which is fixable on the two holding parts (44, 46) of the securing element (26) of the filter element (10).

6. The air filter device according to claim 5, wherein the closing element (40) of on the cover (34) is rotatable about a rotation axis (70) and has a sleeve-shaped holding region (66) with two holding parts (56) such that the securing element (26) of the filter element is surroundable by the sleeve-shaped holding region (66), and in a closing position of the closing element (40), the two holding parts (56) of the closing element (40) on the cover (34) engage with the two holding parts (44, 46) of the securing element (26).

7. The air filter device according to claim 5, wherein the housing (12) of the air filter device has a retaining recess (80) in which a holding lug (76) of the filter element (10) is inserted such that the securing element (26) of the filter element (10) is oriented in a correct position for closing the cover (34) with the closing element (40).

8. The air filter device according to claim 7, wherein the housing (12) of the air filter device has a retaining element (82) configured, as viewed in the insertion direction (22), as upward-sloping, ramp-shaped retaining teeth, which is mounted upstream of the retaining recess (80) in the insertion direction (22).

9. The air filter device according to claim 7, wherein the housing (12) has a ramp (100) which is disposed in a longitudinal direction of extension of the retaining recess (80) next to the retaining recess (80) and wherein the ramp (100) is configured as sloping downwards starting from the retaining recess (80) as viewed in the insertion direction (22).

10. The air filter device according to claim 9, wherein the ramp (100) has an apex region (102) and wherein a height of the ramp (100) in the apex region (102) is greater than a maximum height of a retaining element (82) and/or the ramp (100), as viewed in the insertion direction (22), is configured as sloping upwards towards the apex region (102).

* * * * *